United States Patent
Bongio Karrman et al.

(10) Patent No.: US 11,354,772 B2
(45) Date of Patent: Jun. 7, 2022

(54) CROSS-MODALITY IMAGE GENERATION

(71) Applicant: Raytheon Company, Waltham, MA (US)

(72) Inventors: Anton Bongio Karrman, Los Angeles, CA (US); Ryan C. Fan, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/935,646

(22) Filed: Jul. 22, 2020

(65) Prior Publication Data

US 2021/0027207 A1  Jan. 28, 2021

Related U.S. Application Data

(60) Provisional application No. 62/877,167, filed on Jul. 22, 2019, provisional application No. 62/877,182, filed on Jul. 22, 2019.

(51) Int. Cl.
*G06T 3/00* (2006.01)
*G06T 7/50* (2017.01)
(Continued)

(52) U.S. Cl.
CPC ........... *G06T 3/0068* (2013.01); *G06N 20/00* (2019.01); *G06N 20/20* (2019.01); *G06T 7/30* (2017.01);
(Continued)

(58) Field of Classification Search
CPC .. G06T 7/74; G06T 2207/20081; G06N 20/20
See application file for complete search history.

(56) References Cited

U.S. PATENT DOCUMENTS

| | | |
|---|---|---|
| 2019/0130253 A1 | 5/2019 | Schultz |
| 2019/0318474 A1* | 10/2019 | Han ..................... G06K 9/6267 |

(Continued)

FOREIGN PATENT DOCUMENTS

| | | |
|---|---|---|
| WO | WO-2021015840 A1 | 1/2021 |
| WO | WO-2021016352 A1 | 1/2021 |
| WO | WO-2021016358 A1 | 1/2021 |

OTHER PUBLICATIONS

Namil Kim et al "Multispectral Transfer Network: Unsupervised Depth Estimation for All-Day Vision", AAAI Conference on Artificial Intelligence, Apr. 1, 2018 (Apr. 1, 2018), pp. 6983-6991 (Kim et al.) (Year: 2018).*

(Continued)

*Primary Examiner* — Myron Wyche
(74) *Attorney, Agent, or Firm* — Schwegman Lundberg & Woessner, P.A.

(57) ABSTRACT

Systems, devices, methods, and computer-readable media for image processing by machine learning are provided. A method includes providing, as input to a first machine learning (ML) model trained based on image and corresponding depth data, data of a first image, the first image captured by a sensor of a first modality. The method includes receiving, from the ML model, an estimated depth per pixel of the first image. The method includes providing, as input to a second ML model trained based on the first image and a loss in constructing an estimated second image in a second modality, the first image and receiving, from the second ML model, estimated transformation parameters that transform the first image from the first modality to the second modality. The method includes using the estimated transformation parameters and the estimated depth to generate an estimated second image in the second modality.

17 Claims, 4 Drawing Sheets

(51) Int. Cl.
G06T 7/30 (2017.01)
G06N 20/00 (2019.01)
G06T 7/73 (2017.01)
G06N 20/20 (2019.01)

(52) U.S. Cl.
CPC .............. *G06T 7/50* (2017.01); *G06T 7/74* (2017.01); *G06T 2207/10044* (2013.01); *G06T 2207/10072* (2013.01); *G06T 2207/20076* (2013.01); *G06T 2207/20081* (2013.01); *G06T 2207/20224* (2013.01); *G06T 2207/30244* (2013.01)

(56) References Cited

U.S. PATENT DOCUMENTS

2021/0027113 A1 1/2021 Goldstein et al.
2021/0027417 A1 1/2021 Bongio Karrman et al.

OTHER PUBLICATIONS

Forget, Yann, et al., "Fusion Scheme for Automatic and Large-Scaled Built-up Mapping", IEEE. IGARSS, (2018), 2072-2075.
Jain, V, et al., "A Multi-Sensor Fusion Framework in 3D", IEEE Conference on Computer Vision and Pattern Recognition Workshops., (2013), 6 pgs.
Kim, Kyoung Soo, et al., "Robust Multi-Sensor Image Registration by Enhancing Statistical Correlation", 7th International Conference on Information Fusion (FUSION), (2005), 380-386.
Lavely, Eugene, et al., "Model-based, multi-sensor fusion and bundle adjustment for image registration and target recognition", Algorithms for Synthetic Aperture Radar Imagery XIII, Proc. SPIE 6237, 62370R, (2006), 1-13.
Li, Y, "Multimodal Image Registration with Line Segments by Selective Search", IEEE Transactions on Cybernetics, vol. 47, No. 5, (May 2017), 1285-1298.
Mahjourian, Reza, et al., "Unsupervised Learning of Depth and Ego-Motion from Monocular Video Using 3D Geometric Constraints", arXiv:1802.05522v2 [cs.CV], (2018), 9 pgs.
Ronneberger, Olaf, et al., "U-Net Convolutional Networks for Biomedical Image Segmentation", Computer Science Department and BIOSS Centre for Biological Signalling Studies, University of Freiburg, Germany, (May 18, 2015), 234-241.
Ross, W D, et al., "Multi-sensor 3D image fusion and interactive search", Proceedings of the Third International Conference on Information Fusion, vol. 1, (2000), 10-17.
Schmitt, M, et al., "The Sen1-2 Dataset for Deep Learning in SAR-Optical Data Fusion", Commission I, WG I/3. arXiv:1807.01569v1 [cs.CV], [Online], Retrieved from the Internet: <URL: https://arxiv.org/abs/1807.01569>, (2018), 6 pgs.
Wang, Puyang, et al., "Generating High Quality Visible Images from SAR Images Using CNNs", arXiv:1802.10036v1 [cs.CV], [Online], Retrieved from the Internet: <URL: https://arxiv.org/abs/1802.10036>, (2018), 6 pgs.
Zhou, Tinghui, et al., "Unsupervised Learning of Depth and Ego-Motion form Video", CVPR. arXiv:1704.07813, (2017), 10 pgs.
"International Application Serial No. PCT/US2020/033812, International Search Report dated Aug. 11, 2020", 3 pgs.
"International Application Serial No. PCT/US2020/033812, Written Opinion dated Aug. 11, 2020", 6 pgs.
"International Application Serial No. PCT/US2020/043071, International Search Report dated Nov. 2, 2020", 3 pgs.
"International Application Serial No. PCT/US2020/043071, Written Opinion dated Nov. 2, 2020", 7 pgs.
"International Application Serial No. PCT/US2020/043085, International Search Report dated Nov. 2, 2020", 3 pgs.
"International Application Serial No. PCT/US2020/043085, Written Opinion dated Nov. 2, 2020", 6 pgs.
Andreas, Ley, et al., "Exploiting GAN-Based SAR to Optical image Transcoding for Improved Classification via Deep Learning", EUSAR, 12th European Conference on Synthetic Aperture Radar, (Jun. 7, 2018), 396-401.
Grohnfeldt, Claas, et al., "A Conditional Generative Adversarial Network to Fuse Sar and Multi spectral Optical Data for Cloud Removal from Sentinel-2 Images", IGARSS IEEE International Geoscience and Remote Sensing Symposium, IEEE, (Jul. 22, 2018), 1726-1729.
Matthias, Limmer, et al., "Infrared Colorization Using Deep Convolutional Neural Networks", (Apr. 8, 2016), 8 pgs.
Merkle, Nina, et al., "Exploring the Potential of Conditional Adversarial Networks for Optical and SAR Image Matching", IEEE Journal of Selected Topics In Applied Earth Observations And Remote Sensing, IEEE, USA, vol. 11, No. 6, (Jun. 1, 2018), 1811-1820.
Namil, Kim, et al., "Multispectral Transfer Network: Unsupervised Depth Estimation for All-Day Vision", AAAI Conference on Artificial Intelligence, (Apr. 1, 2018), 6983-6991.
Qayynm, Usman, et al., "Thermal colorization using deep neural network", 15th International Bhurban Conference on Applied Sciences and Technology (IBCAST), IEEE, (Jan. 9, 2018), 325-329.
Quan, Dou, et al., "Using deep neural networks for synthetic aperture radar image registration", IEEE International Geoscience and Remote Sensing Symposium (IGARSS), IEEE, (Jul. 10, 2016), 2799-2802.
Shi, Lei Fu, et al., "Reciprocal Translation between SAR and Optical Remote Sensing Images with Cascaded-Residual Adversarial Networks", Arxiv.Org, Cornell University Library, 201 Olin Library Cornell University Ithaca, NY, (Jan. 24, 2019), 18 pgs.
Tao, Junyi, et al., "Automatic SAR Simulation Technique for Object Identification in Complex Urban Scenarios", IEEE Journal of Selected Topics in Applied Earth Observations and Remote Sensing, IEEE, USA, vol. 7, No. 3, (Mar. 1, 2014), 994-1003.
Zhou, Tinghui, et al., "Unsupervised Learning of Depth and Ego-Motion from Video", IEEE Conference on Computer Vision and Pattern Recognition (CVPR), IEEE Computer Society, US, (Jul. 21, 2017), 6612-6619.
"U.S. Appl. No. 16/518,728, Non Final Office Action dated Nov. 4, 2021", 13 pgs.
Chen, Yunfan, et al., "Multi-layer fusion techniques using a CNN for multispectral pedestrian detection", The Institute of Engineering and Technology Journal, (2018).
"International Application Serial No. PCT US2020 043071, International Preliminary Report on Patentability dated Feb. 3, 2022", 9 pgs.
"International Application Serial No. PCT US2020 043085, International Preliminary Report on Patentability dated Feb. 3, 2022", 8 pgs.
"International Application Serial No. PCT US2020 033812, International Preliminary Report on Patentability dated Feb. 3, 2022", 8 pgs.
"U.S. Appl. No. 16/518,728, Response filed Feb. 4, 2022 to Non Final Office Action dated Nov. 4, 2021", 8 pgs.

* cited by examiner

CROSS-MODALITY IMAGE GENERATION

RELATED APPLICATIONS

This patent application claims the benefit of priority to U.S. provisional patent application No. 62/877,167, filed Jul. 22, 2019, which is hereby incorporated by reference in its entirety; and this patent application claims the benefit of priority to U.S. provisional patent application No. 62/877,182, filed Jul. 22, 2019, which is hereby incorporated by reference in its entirety.

BACKGROUND

Image processing generally uses computer techniques to alter or generate one or more images. Image processing can include classification, feature extraction, multi-scale analysis, pattern recognition, projection, or the like. Image processing can include applying a filter or mask to image data, performing a fast Fourier transform (FFT), padding, an affine transformation, or the like. Image processing can include registering a first image to an image space of a reference image. Image registration is the process of aligning two or more images of a same scene. In image registration, one image is designated as a reference image and a geometric transformation between the reference image and the first image is applied to transform the first image to the image space of the reference image.

DETAILED DESCRIPTION

Figure 1:
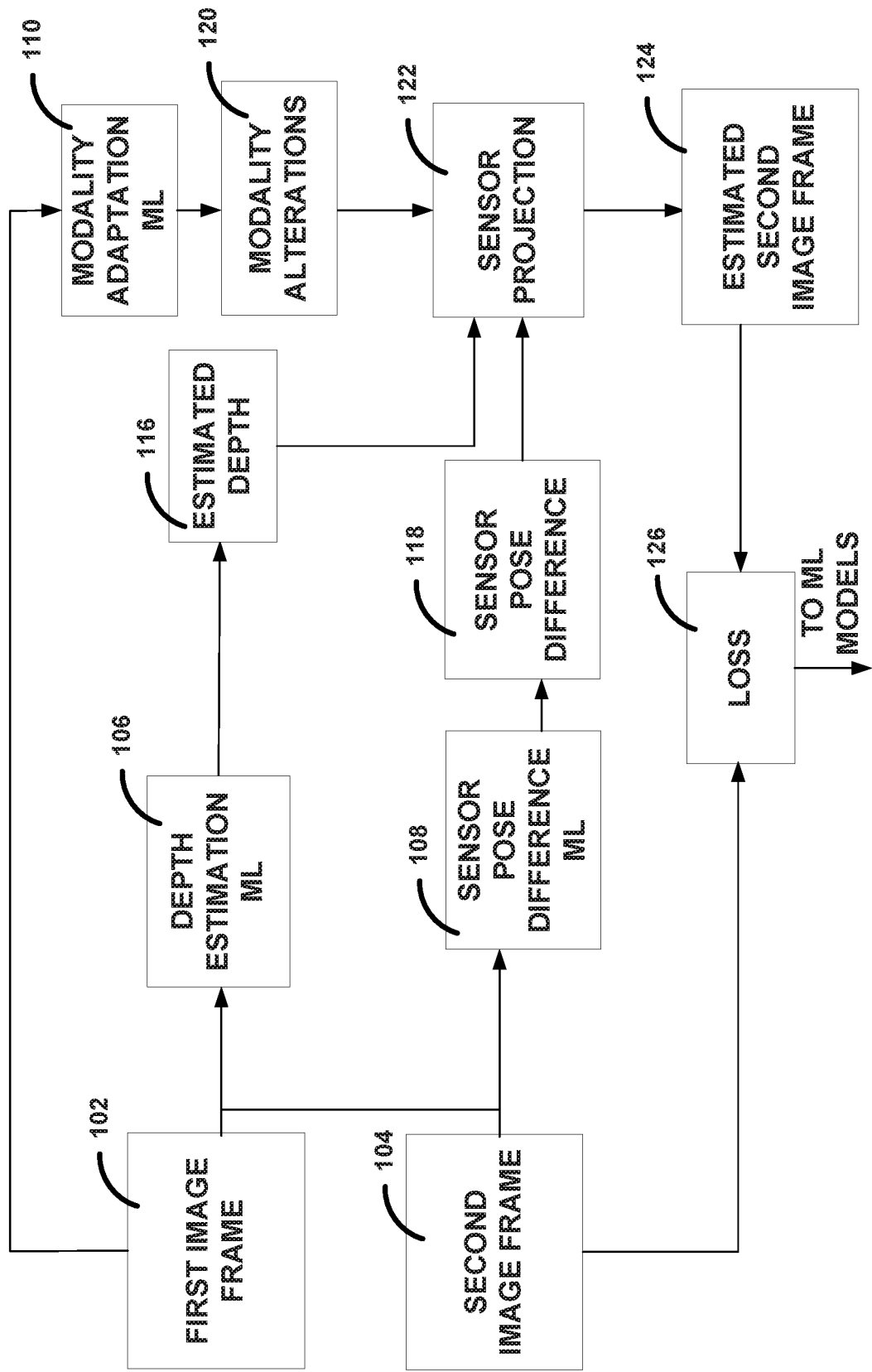
FIG. 1 illustrates, by way of example, a diagram of an embodiment of a training system for image processing.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to image registration or image generation. Some embodiments regard image registration using machine learning (ML). The ML technique can use geometric diversity or co-incident sensors as feedback, such as for ML model training. The ML technique can register images to each other, rather than using a direct calculation to perform registration. Three-dimensional (3D) scene information can be extracted from the process. A disambiguated depth per image pixel can be learned via a self-supervised mechanism if either (i) another nearby but spatially offset sensor senses the same scene (e.g., at the same time (allowing for similar phenomenology as stereo depth estimation)), or (ii) the same sensor is moving and continuously recording video (allowing for similar phenomenology as structure from motion). In some embodiments, an image in a first modality (e.g., visible band, such as electro-optical, color, black and white, or the like) can be converted to a second modality (e.g., infrared, thermal image, or the like).

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Embodiments can provide a registration of first and second image data to each other or generate an image of a second type (generated using a sensor of a second modality) based on an image of a first type (generated using a sensor of first modality). A modality generally refers to a subset of the electromagnetic spectrum, an image generation methodology, a sensor, or the like. Example modalities include visible, IR, radio frequency (RF), light detection and ranging (LIDAR), or the like. The second image can be of a same scene, or a portion of the scene, as that of the first image. Said another way, the first image and the second image can be of an overlapping field of view. The second image can be captured from a different perspective than the first image. Perspective includes intrinsic camera parameters and extrinsic camera parameters. Intrinsic camera parameters include focal length, image center, and lens distortion. Extrinsic camera parameters include camera position and orientation.

The registration can use an ML technique, such as a deep learning NN technique. The technique provides improvements over prior registration techniques. One improvement can include that the deep learning NN technique is unsupervised and thus more scalable. In unsupervised ML, there is no need to label the data as there is in supervised ML. The sheer number of a data points that need to be labeled, which is provided by human labeling of data, makes the supervised techniques less scalable. Using an unsupervised ML technique makes the registration scalable and faster to implement than the supervised ML technique.

Embodiments can be applied to coincident imagery (e.g., visible band, infrared (IR), light detection and ranging (LIDAR), or the like). At inference time, embodiments can quickly register the imagery or generate imagery in a different modality. The first or second image can be captured using one or more sensors mounted on/in a vehicle, such as an airborne or land vehicle, a stationary platform, a device under control of a human or robot, or the like.

Embodiments can estimate three-dimensional (3D) content of the scene of objects given their visible band image, infrared image, or the like. Embodiments can estimate an IR image based on a visible band image, or vice versa.

One or more deep networks can be trained to estimate approximate depth (e.g., per pixel). The depth can be used, at least in part, to construct an image in a different modality.

Innovations of embodiments can include learning the registration rather than calculating it directly or estimating an image of a second modality based on an image of a first modality. The ML techniques of embodiments can provide fast test-time inferences, such as for real-time multi-spectral fusion applications. The ML techniques of embodiments can generate a 3D multi-spectral scene reconstruction based on the image data from multiple sensors. Embodiments can provide the 3D multi-spectral scene reconstruction for arbitrary display reference frames.

Embodiments can learn a registration of co-incident images (images of a same scene or images that include an overlap in the scene) using one or more unsupervised deep learning techniques. At inference time, embodiments can register the co-incident images. At inference time, embodiments can estimate 3D content of a scene given visible band or IR image data of the images.

Prior techniques of image registration include using interferometric synthetic aperture radar (SAR) images, or exquisite metadata and sensor calibration. Some prior registration techniques include automated, semi-automated, or hand-selected landmark feature-based matching and registration based thereon.

FIG. 1 illustrates, by way of example, a diagram of an embodiment of a system 100 for training ML models for image processing. The system 100 as illustrated includes a first image 102 and a second image 104 used as inputs to ML techniques 106, 108, 110. The ML techniques 106, 108, 110 can be different layers of a neural network (NN) or different ML models.

The first image 102 can include a visible spectrum image, infrared (IR) image, light detection and ranging (LIDAR) image, or the like. An example of a visible spectrum image is an electro-optical (EO) image or a frame of a video. A visible spectrum image can be generated using a charge coupled device, or the like, that converts light incident thereon to an electrical signal. A parameter of the electrical signal can indicate an intensity, color, or the like of the light incident thereon. The second image 104 can be of a different modality than the first image 102, such as an IR Image, a visible spectrum image, LIDAR image, or the like.

The ML technique 106, 108, 110 can include or more of an NN, a Bayesian technique, a K-means clustering technique, a Support Vector Machine (SVM) technique, a linear regression technique, a decision tree, a random forest technique, a logistic regression technique, and a nearest neighbor technique, among others. The NNs can include deep learning NNs. The NNs can be hierarchical, in which one layer depends on an output of a previous layer, or parallel, in which a layer can operate independent of an output of another layer. The ML technique 106, 108, 110 can include a same or different ML technique. In some embodiments, one or more of the ML techniques 106, 108, 110 include convolutional NNs (CNNs). The ML technique 106 can identify and generate features of the first image 102. The features are individual measurable properties of the first image 102. The ML technique 106 can transform the first image 102 into a meaningful representation, namely the features.

The NNs can include a fully or partially convolutional NN, a deep convolutional network with a dilated convolution, a deep convolutional network with a residual block or densely connected convolutional block, a convolutional architecture with an auto-encoder, a U-Net convolutional architecture (e.g., with a skip connection), or a recurrent convolutional network architecture. A fully convolutional architecture includes an NN composed of convolutional layers without any fully connected layers or a multi-layer perceptron (MLP). A partially convolutional architecture includes an NN in which overall image dimensions decrease nearer an output layer until all features are flattened to a vector. The dimension decrease can be provided using max pooling layer, or the like. It is common to refer to what is called a partially convolutional NN herein as a convolutional NN. A deep convolutional NN is a convolutional NN with more than two NN layers. A dilated convolution integrates a more global context into, for example, object detection or segmentation. In dilated convolutional networks, a dilation factor is greater than one and usually increases linearly or exponentially at each layer for faster growth of the receptive field of the network. A difference between a dilated convolutional NN and a normal convolutional NN is that the dilation factor for a normal convolutional NN is 1. The receptive field is how many pixels have contributed some information to single neuron in a network. Neurons that are in deeper layers of an NN usually have a larger receptive field because a larger section of the input image has been used in the computation of that neuron. A dilated convolutional NN is completely convolutional (unlike max pooling) and allows for just as much, if not more, receptive field growth.

A residual block is a special case of a highway network without any gates in a skip connection. A residual block allows the flow of memory (or information) from initial layers to last layers. A densely connected convolutional block includes connections from each layer to every other layer of the NN. An autoencoder includes encoder and decoder NNs that transform input space to a feature space and back to the input space. An autoencoder may be compressive, if the number of dimensions in the feature space is fewer than the number of input dimensions. Variational autoencoders (VAE), or denoising autoencoders are examples of autoencoders. A modified fully-convolutional UNET architecture is an example of a network segmentation model that may be trained using an autoencoder. Once trained, the encoder network of an autoencoder may be used to transform the received data into the learned feature space of the autoencoder. The transformed data may then be used as input to the ML technique or within the ML technique. A description of U-NET can be found in the publication "U-Net: Convolutional Networks for Biomedical Image Segmentation" by Olaf Ronneberger, Philipp Fischer, and Thomas Brox. A recurrent convolutional NN uses a recurrent architecture with convolutions. The most common way this is done is by using convolutions to extract dense image features, and then recurrently processing the dense features. A less common way to implement a recurrent convolutional NN is to apply recurrent networks to small receptive fields convolutionally across the image.

A CNN is a feed-forward ML technique that is generally used for an image analysis tasks. The CNN accepts pixel values as input and layers carry out feature extraction from the CNN. The CNN can include one or more convolution layers, activation functions (e.g., a rectified linear unit (ReLU) or exponential linear unit (ELU), or the like), or normalization layers (e.g., batch normalization, layer normalization, or group normalization layers), pooling (e.g., max, average, or the like) layers, or the like. A pooling layer can flatten X and Y image dimensions of an image.

In embodiments in which the ML technique 106, 108, 110 includes a CNN, the features can be considered convolutional features. The CNN layer is a sort of convolution filter that is applied to the input to produce the features.

The features can be operated on by the ML technique 106. The ML technique 106 can provide an estimated depth 116 (e.g., per pixel) based on the features. The ML technique 106 can be same or different from the ML technique 108, 110. The ML technique 106 can include a fully-convolutional layer (in an example of a CNN). The full-convolutional layer can characterize the features into the estimated depth 116.

The ML technique 108 receives the first image 102 and the second image 104. The ML technique 108 determines a sensor pose difference 118 between the first image 102 and the second image 104. The sensor pose difference 118 can include a rotation, translation or scaling (e.g., of intensity, brightness, contrast, or the like), or the like. The sensor pose difference 118 can be learned such that a pixel in the first image 102 corresponds to a pixel in the second image 104 after a transform in accord with the sensor pose difference 118 is applied thereto.

The ML technique 108 can include a deep convolutional network that maps image pairs to a vector of much smaller dimension (for example 6, which corresponds to rotational and translation imaging sensor pose difference in three dimensions). Examples include convolutional residual networks or densely-connected convolutional networks.

The ML technique 108 can include a deep dense network. In a deep dense network (sometimes called a fully-connected network) a fully connected or dense layer performs a linear operation in which every input is connected to output by a weight. A dense residual network includes a skip connection to jump over some layers. One or more of the ML techniques 106, 108, 110 can be a component of a spatial transformer network. The operation 122 can include a differential image resampling procedure initially used in spatial transformer networks.

The modality adaptation ML 110 can learn differences between corresponding pixel values of images of a first modality and a second modality. In some embodiments, bilinear interpolation can be used to determine the modality alterations 120. For example, a bilinear interpolation of an upper left, lower left, upper right, or lower right immediately contiguous, kitty-corner neighboring pixel can help determine the mapping from one modality to another. These differences can be pixel value dependent. Application of these differences to an image are called modality alterations 120. Different modality alterations 120 can be learned for different modality changes. For example, a pixel value of a visible band image is altered in a first manner to change the pixel value to a corresponding pixel value of an IR band image and a second, different manner to change the pixel value to a corresponding pixel value of a LIDAR image. At operation 120, the learned modality adaptations are provided as input to a sensor projection operation 122.

The operation 122 can use the learned modality alterations 120, estimated depth 116, and sensor pose difference 118 to generate an estimated second image frame 124. The estimated second image frame 124 is the first image frame 102 transformed to a different modality and to the perspective of the first image.

The input to the sensor projection operation 122 can be for a general image projection. The ML technique 108 can learn both extrinsic and intrinsic imaging parameters (examples of which are previously discussed).

A difference between the estimated second image 124 and the second image 104 can define feedback in the form of loss 126. The loss 126 can be used to further train the ML technique 106, 108, 110. Common loss functions for training the ML techniques 106, 108, 110 include mean square loss, mean absolute loss, mean bias loss, or the like.

Figure 2:
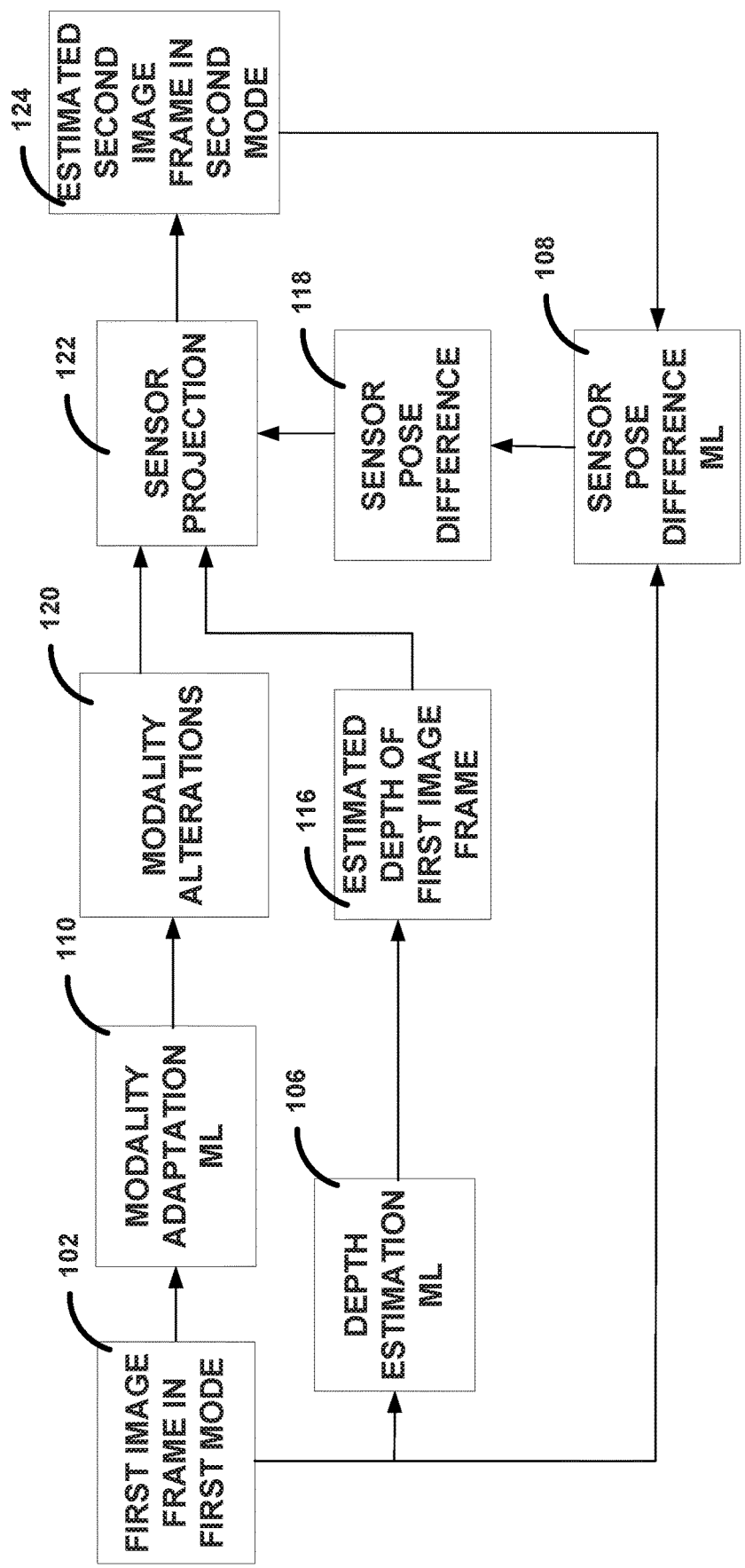
FIG. 2 illustrates, by way of example, a diagram of an embodiment of a use of the trained system of FIG. 1.

FIG. 2 illustrates, by way of example a diagram of an embodiment of a trained ML image processing system 200 used during runtime. The ML models 106, 108, 110 of the ML image processing system 200 can be trained using the system 100, such as simultaneously. A first image 102 generated in a first modality can be provided to each of the ML models 106, 108, 110. The ML model 106 can generate an estimated depth 116 (e.g., per pixel) of the first image 102. The ML model 110 can provide alterations to the pixel values of the first image 102 that make the first image 102 appear as if it were captured using a different type of sensor (a different modality). The output of the ML model 110 can be the first image in a second modality 112 or the modality alterations 120 to be applied to generate the first image in the second modality 112.

The sensor pose difference ML 108 can receive the estimated second image frame in the second modality 124 and the first image in the first modality 102 to estimate sensor pose difference 118. The sensor pose difference 118 can be assumed to be linear in time, such that a sensor pose difference 118 for a prior time is assumed to be applicable to an immediately next instance of time. The immediately next instance of time can be a frame rate of a sensor that is capturing the image frames (e.g., the first image frames 102). For example, the sensor pose difference ML 108 can estimate the delta in parameters between the sensor pose at the first time and the sensor pose at the second time.

The sensor projection operation 122 can apply the modality alterations 120 to the first image 102 to generate the first image 102 in a second modality. The sensor projection operation 122 can use the estimated depth 116 and the sensor pose difference 118 to project the first image 102 in the second modality to an image space of a second image captured by a sensor of the second modality with a sensor pose defined by the sensor pose difference 118, to generate an estimated second image frame in the second mode 124. The estimated second image is the first image in a different modality and seen from a different perspective, defined by the sensor pose difference 118.

Figure 3:
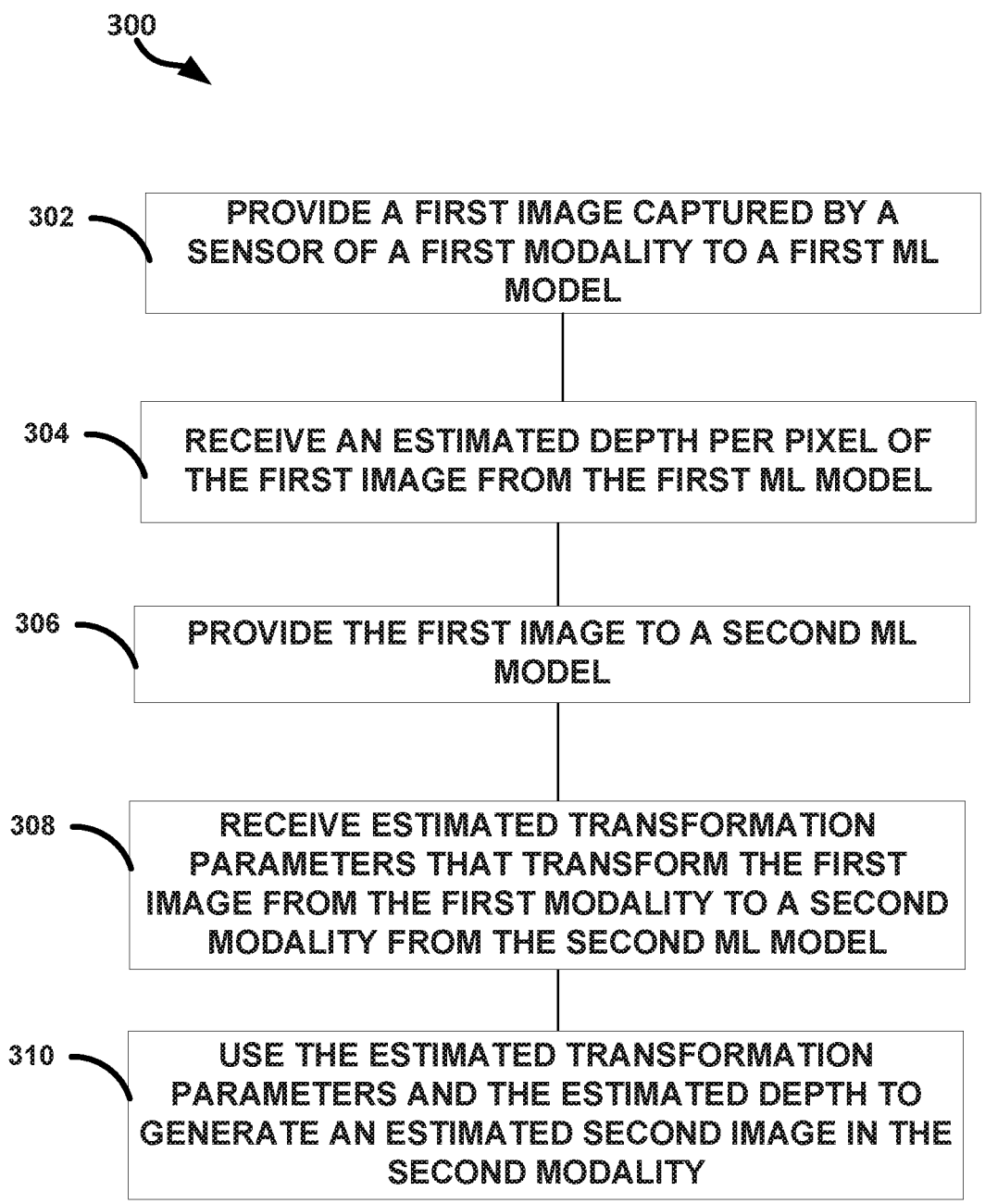
FIG. 3 illustrates, by way of example, a diagram of an embodiment of a method for image processing.

FIG. 3 illustrates, by way of example, a diagram of an embodiment of a method 300 for image processing. The method as illustrated includes providing data of a first image captured by a sensor of a first modality to a first ML model, at operation 302; receiving, from the first ML model, an estimated depth per pixel of the first image, at operation 304; providing the first image to a second ML model, at operation 306; receiving, from the second ML model, estimated transformation parameters that transform the first image from the first modality to the second modality, at operation 308; and using the estimated transformation parameters and the estimated depth to generate an estimated second image in the second modality, at operation 310. The first ML model can be trained based on image data and corresponding depth data. The second ML model can be trained based on the same image data used to train the first model and a loss in constructing an estimated second image in a second modality.

The method 300 can further include providing, as input to a third ML model trained based on pairs of images of a same geographic area each pair of the pairs of images including the first image and a second image captured by a sensor of the second modality, the first image and the estimated second image. The method 300 can further include receiving an estimated camera pose difference between the first image and the estimated second image. The estimated second image can be generated further using the estimated camera pose difference.

The sensor of the first modality can be a visible band sensor or an infrared sensor. The sensor of the second modality can be an infrared sensor or a visible band sensor. Training the first ML model or the second ML model includes using a difference between the second image and the estimated second image as the loss. The first image is captured at a first time and the second image is captured at a second time after the first time. The first time can correspond to a video frame immediately preceding the second image.

While the discussion in this application regards transforming one image to an image of a second image space or registering two images to each other, the subject is applicable to collections of more than two images. For example, consider three images, two visible band images at different poses, and one IR image. The relative transform parameters can be determined for each of the transformations between (1) the two visible band images, (2) a first visible band image and the IR image, and (3) the second visible band image and the IR image. Given N images, this would be N choose 2 transformations. With the modality, pose, and depth, either of the visible images can be transformed to the image space of the IR image.

In some embodiments, the first image 102 can include an IR image and the second image 104 can include a visible band image. The system 100 can infer 3D content (as a depth map) or estimate an IR image given the visible band image or vice versa. In some embodiments, the first image 102 can be registered to the second image 104. The first image 102 and the second image, in some embodiments, can be part of respective video streams.

Given an IR video stream that is misaligned in time and/or space with a visible band video stream, a deep network can be trained to register the two at an object-scattering (pixel) level. The trained network, at inference time can then quickly register new video streams, as well infer 3D scene content (as a depth map), and even estimate one modality given the other (for example, after training, estimate red/green/blue scattering given only an infrared frame).

Registering IR and visible band imagery has been attempted directly, but embodiments herein register using an unsupervised deep network, which has not been done before. Estimation of one modality conditioned on an image of another has been done, but not while jointly trying to register the scattering objects via geometric projections in a deep neural network The deep network can be trained to infer depth and modality adaptation for the current frame, and camera pose difference for the current frame and next frame. Then with the camera pose difference and the depth, the current frame pixel locations can be projected into the next frame to get pixel values for a reconstruction that is then created in the current frame. The absolute error between the reconstruction and the current frame can be reduced with respect to the deep network parameters using stochastic gradient descent or other technique.

Thus, embodiments can estimate depth and modality signature of IR given a visible-band signature. Embodiments can accomplish sensor fusion by combining ML with sensor modeling. The ML can be unsupervised and use geometric diversity and co-incident sensors as feedback. Image or video registration can be learned, rather than directly calculated. In some embodiments, 3D scene information can be extracted at inference time, such as based on an IR image, visible band image, or the like.

Embodiments can register visible and IR (or other) imagery using a scalable deep learning approach. The deep learning approach overcomes scalability of supervised learning approaches by eliminating a need for labelled data. Embodiments can operate to quickly fuse (register) images of different modalities. Embodiments can generate a 3D fused multi-spectral scene reconstruction and enable arbitrary display reference frames for an end-user.

Thus, embodiments can learn to register co-incident Visible-Band and IR Video via an unsupervised deep learning method. At inference time, embodiments can then quickly register visible-band and IR video and (as a byproduct) estimate 3D content of the scene and expected IR signature of objects given their visible band signature.

Embodiments can perform the multi-modal registration without metadata. Prior techniques use direct photogrammetric computations, stereoscopic imagery, or co-located sensor calibration, all of which require exquisite metadata. Further, embodiments can perform without landmark feature matching. Other techniques use automated, semi-Automated, or hand-selected landmark feature-based matching and registration.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 4:
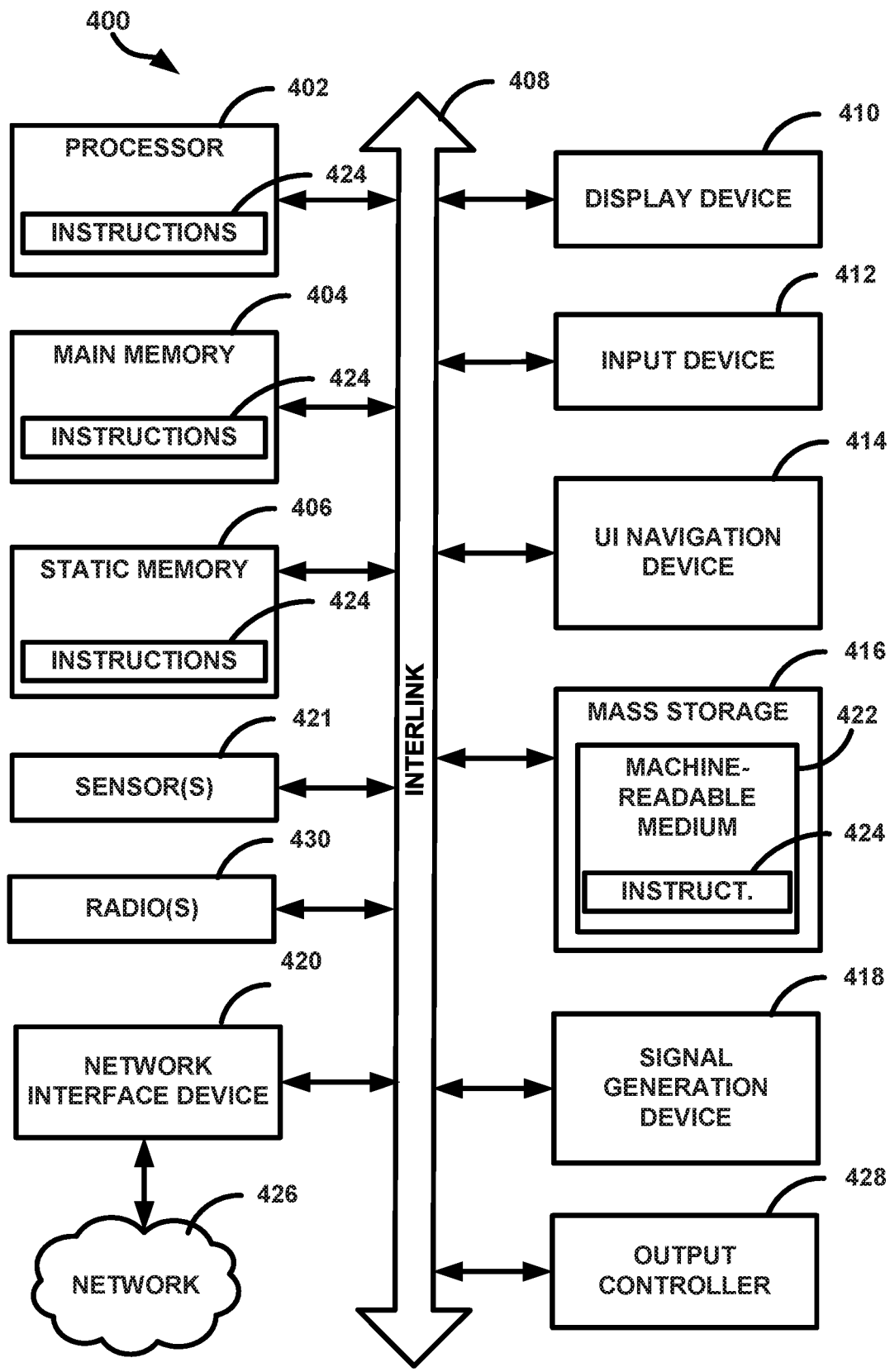
FIG. 4 illustrates, by way of example, a block diagram of an embodiment of a machine (e.g., a computer system) to implement one or more embodiments.

FIG. 4 illustrates, by way of example, a block diagram of an embodiment of a machine in the example form of a computer system 400 within which instructions, for causing the machine to perform any one or more of the methodologies discussed herein, may be executed. One or more of the ML techniques 106, 108, 110 or operations 120, 122 can be implemented or performed by the computer system 400. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 421 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 404 and a static memory 406, which communicate with each other via a bus 408. The memory 404, 406 can store parameters (sometimes called weights) that define operations the ML technique 106, 108, 110. The computer system 800 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), a network interface device 420, and radios 430 such as Bluetooth, WWAN, WLAN, and NFC, permitting the application of security controls on such protocols. The machine as illustrated includes an output controller 428. The output controller 428 manages data flow to/from the machine 400. The output controller 428 is sometimes called a device controller, with software that directly interacts with the output controller 428 being called a device driver.

Machine-Readable Medium

The disk drive unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404, the static memory 406, and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 can include a method comprising providing, as input to a first machine learning (ML) model trained based on image and corresponding depth data, data of a first image, the first image captured by a sensor of a first modality, receiving, from the ML model, an estimated depth per pixel of the first image, providing, as input to a second ML model trained based on the first image and a loss in constructing an estimated second image in a second modality, the first image, receiving, from the second ML model, estimated transformation parameters that transform the first image from the first modality to the second modality, and using the estimated transformation parameters and the estimated depth to generate an estimated second image in the second modality.

In Example 2, Example 1 can further include providing, as input to a third ML model trained based on pairs of images of a same geographic area each pair of the pairs of images including the first image and a second image captured by a sensor of the second modality, the first image and the estimated second image, and receiving an estimated camera pose difference between the first image and the estimated second image, wherein the estimated second image is generated further using the estimated camera pose difference.

In Example 3, at least one of Examples 1-2 can further include, wherein the sensor of the first modality is a visible band sensor or an infrared sensor.

In Example 4, Example 3 can further include, wherein the sensor of the second modality is an infrared sensor or a visible band sensor.

In Example 5, at least one of Examples 1-4 can further include, wherein training the first ML model or the second ML model includes using a differences between the second image and the estimated second image as the loss.

In Example 6, at least one of Examples 1-5 can further include, wherein the first image is captured at a first time and the second image is captured at a second time after the first time.

In Example 7, Example 6 can further include, wherein the first time corresponds to a frame immediately preceding the second image.

Example 8 includes a non-transitory machine-readable medium including instructions that, when executed by a machine, cause the machine to perform operations for cross-modality image generation, the operations comprising providing, as input to a first machine learning (ML) model trained based on image and corresponding depth data, data of a first image, the first image captured by a sensor of a first modality, receiving, from the ML model, an estimated depth per pixel of the first image, providing, as input to a second ML model trained based on the first image and a loss in constructing an estimated second image in a different second modality, the first image, receiving, from the second ML model, estimated transformation parameters that transform the first image from the first modality to the second modality, and using the estimated transformation parameters and the estimated depth to generate an estimated second image in the second modality.

In Example 9, Example 8 can further include, wherein the operations further comprise providing, as input to a third ML model trained based on pairs of images of a same geographic area each pair of the pairs of images including the first image and a second image captured by a sensor of the second modality, the first image and the estimated second image, and receiving an estimated camera pose difference between the first image and the estimated second image, wherein the estimated second image is generated further using the estimated camera pose difference.

In Example 10, at least one of Examples 8-9 can further include, wherein the sensor of the first modality is a visible band sensor or an infrared sensor.

In Example 11, Example 10 can further include, wherein the sensor of the second modality is an infrared sensor or a visible band sensor.

In Example 12, at least one of Examples 8-11 can further include, wherein training the first ML model or the second ML model includes using a differences between the second image and the estimated second image as the loss.

In Example 13, at least one of Examples 8-12 can further include, wherein the first image is captured at a first time and the second image is captured at a second time after the first time.

In Example 14, Example 13 can further include, wherein the first time corresponds to a frame immediately preceding the second image.

Example 15 can include a system comprising processing circuitry, at least one memory including parameters of a first and second machine learning (ML) models and instructions stored thereon, the first ML model trained based on image and corresponding depth data, the second ML model trained based on the first image and a loss in constructing an estimated second image in a different second modality, the instructions, when executed by the processing circuitry, cause the processing circuitry to perform operations for cross-modality image generation, the operations comprising providing, as input to the first ML model, data of a first image, the first image captured by a sensor of the first modality, receiving, from the ML model, an estimated depth per pixel of the first image, providing, as input to the second ML model, the first image, receiving, from the second ML model, estimated transformation parameters that transform the first image from the first modality to the second modality, and using the estimated transformation parameters and the estimated depth to generate an estimated second image in the second modality.

In Example 16, Example 15 can further include, wherein the operations further comprise providing, as input to a third ML model trained based on pairs of images of a same geographic area each pair of the pairs of images including the first image and a second image captured by a sensor of the second modality, the first image and the estimated second image, and receiving an estimated camera pose difference between the first image and the estimated second image, wherein the estimated second image is generated further using the estimated camera pose difference.

In Example 17, at least one of Examples 15-16 can further include, wherein the sensor of the first modality is a visible band sensor or an infrared sensor.

In Example 18, Example 17 can further include, wherein the sensor of the second modality is an infrared sensor or a visible band sensor.

In Example 19, at least one of Examples 15-18 can further include, wherein training the first ML model or the second ML model includes using a differences between the second image and the estimated second image as the loss.

In Example 20, at least one of Examples 15-19 can further include, wherein the first image is captured at a first time and the second image is captured at a second time after the first time.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   providing, as input to a first machine learning (ML) model trained based on image and corresponding depth data, data of a first image, the first image captured by a sensor of a first modality;
   receiving, from the first ML model, an estimated depth per pixel of the first image;
   providing, as input to a second ML model trained based on the first image and a loss in constructing an estimated second image in a second modality, the first image;
   receiving, from the second MT, model, estimated transformation parameters that transform the first image from the first modality to the second modality;
   using the estimated transformation parameters and the estimated depth to generate an estimated second image in the second modality;
   providing, as input to a third ML model trained based on pairs of images of a same geographic area each pair of the pairs of images including the first image and a second image captured by a sensor of the second modality, the first image and the estimated second image; and
   receiving an estimated camera pose difference between the first image and the estimated second image,
   wherein the estimated second image is generated further using the estimated camera pose difference.

2. The method of claim 1, wherein the sensor of the first modality is a visible band sensor or an infrared sensor.

3. The method of claim 2, wherein the sensor of the second modality is an infrared sensor or a visible band sensor.

4. The method of claim 1, wherein training the first ML model or the second ML model includes using a differences between the second image and the estimated second image as the loss.

5. The method of claim 1, wherein the first image is captured at a first time and the second image is captured at a second time after the first time.

6. The method of claim 5, wherein the first time corresponds to a frame immediately preceding the second image.

7. A non-transitory machine-readable medium including instructions that, when executed by a machine, cause the machine to perform operations for cross-modality image generation, the operations comprising:
   providing, as input to a first machine learning (ML) model trained based on image and corresponding depth data, data of a first image, the first image captured by a sensor of a first modality;
   receiving, from the first ML model, an estimated depth per pixel of the first image;
   providing, as input to a second ML model trained based on the first image and a loss in constructing an estimated second image in a different second modality, the first image;
   receiving, from the second ML model, estimated transformation parameters that transform the first image from the first modality to the second modality;
   using the estimated transformation parameters and the estimated depth to generate an estimated second image in the second modality;
   providing, as input to a third ML model trained based on pairs of images of a same geographic area each pair of the pairs of images including the first image and a second image captured by a sensor of the second modality, the first image and the estimated second image; and
   receiving an estimated camera pose difference between the first image and the estimated second image,
   wherein the estimated second image is generated further using the estimated camera pose difference.

8. The non-transitory machine-readable medium of claim 7, wherein the sensor of the first modality is a visible band sensor or an infrared sensor.

9. The non-transitory machine-readable medium of claim 8, wherein the sensor of the second modality is an infrared sensor or a visible band sensor.

10. The non-transitory machine-readable medium of claim 8, wherein training the first ML model or the second ML model includes using a differences between the second image and the estimated second image as the loss.

11. The non-transitory machine-readable medium of claim 8, wherein the first image is captured at a first time and the second image is captured at a second time after the first time.

12. The non-transitory machine-readable medium of claim 11, wherein the first time corresponds to a frame immediately preceding the second image.

13. A system comprising:
    processing circuitry;
    at least one memory including parameters of a first and second machine learning (ML) models and instructions stored thereon, the first ML model trained based on image and corresponding depth data, the second ML model trained based on the first image and a loss in constructing an estimated second image in a different second modality, the instructions, when executed by the processing circuitry, cause the processing circuitry to perform operations for cross-modality image generation, the operations comprising:
    providing, as input to the first ML model, data of a first image, the first image captured by a sensor of the first modality;

receiving, from the first ML model, an estimated depth per pixel of the first image;

providing, as input to the second ML model, the first image;

receiving, from the second ML model, estimated transformation parameters that transform the first image from the first modality to the second modality;

using the estimated transformation parameters and the estimated depth to generate an estimated second image in the second modality;

providing, as input to a third ML model trained based on pairs of images of a same geographic area each pair of the pairs of images including the first image and a second image captured by a sensor of the second modality, the first image and the estimated second image; and receiving an estimated camera pose difference between the first image and the estimated second image, wherein the estimated second image is generated further using the estimated camera pose difference.

14. The system of claim 13, wherein the sensor of the first modality is a visible band sensor or an infrared sensor.

15. The system of claim 14, wherein the sensor of the second modality is an infrared sensor or a visible band sensor.

16. The system of claim 13, wherein training the first ML model or the second ML model includes using a differences between the second image and the estimated second image as the loss.

17. The system of claim 13, wherein the first image is captured at a first time and the second image is captured at a second time after the first time.

* * * * *